May 16, 1944.  J. H. LAMONT  2,349,180

PIPE COUPLING

Filed Nov. 16, 1942  2 Sheets-Sheet 1

INVENTOR
JAMES HUNTER LAMONT
BY
ATTORNEYS

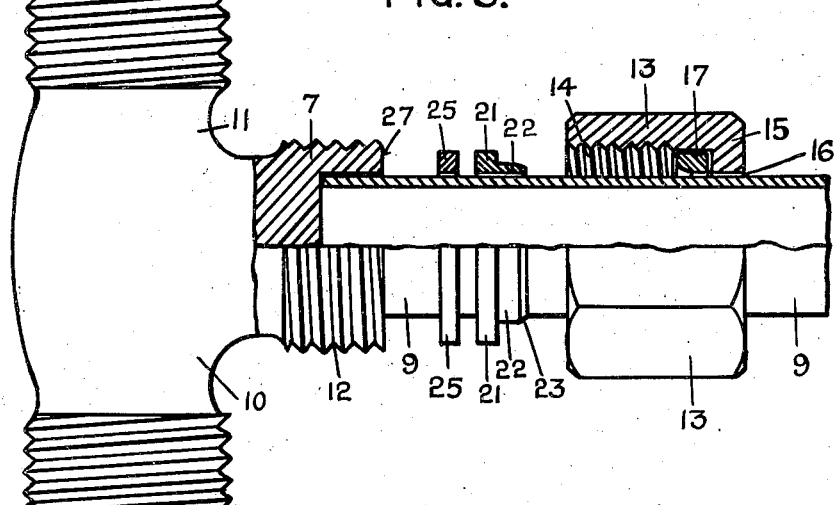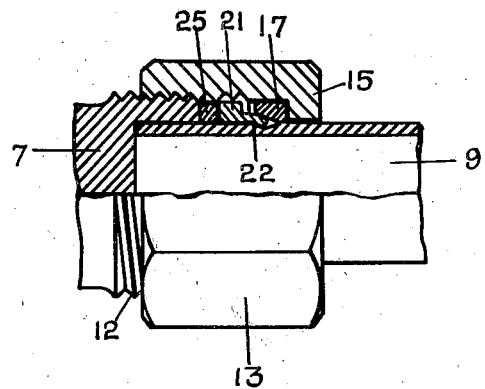

Patented May 16, 1944

2,349,180

UNITED STATES PATENT OFFICE 2,349,180

PIPE COUPLING

James Hunter Lamont, Edinburgh, Scotland; Mary Somerville Stables or Lamont, Russel Patrick, and John Waugh, executors of said James Hunter Lamont, deceased, all of Edinburgh, Scotland, assignors to James H. Lamont and Company, Limited, Edinburgh, Scotland, a corporation of Great Britain Application November 16, 1942, Serial No. 465,661

6 Claims. (Cl. 285—87)

This invention relates to pipe coupling devices for joints or couplings used for joining a pipe to a tubular metal junction piece, which may be a straight metal union, or an angular or bent metal union, such as a bend, elbow, T-piece or cross-piece, or for joining two pipes together, using a straight or bent tubular metal junction piece between the two pipe ends, and is applicable to joints for pipes of comparatively ductile metal, such as copper, or to joints for hard metal pipes, such as drawn or welded steel or iron piping.

The object of the present invention is to eliminate any possibility of the end of the pipe being twisted when screwing-up the coupling nut in the making of the joint.

A pipe coupling device according to the present invention comprises a tubular junction piece having an externally screw-threaded end portion internally counterbored to receive the end of the pipe to be coupled thereto, a coupling nut internally screw-threaded to fit the external thread on said junction piece, said nut having an internal shoulder apertured to revolubly fit on the pipe, an internally coned sleeve revolubly mounted in the nut between the thread of the nut and the said shoulder, said sleeve presenting an abrupt end face at the wider end of its internally coned surface which tapers towards said shoulder, a ring revoluble on the pipe and adapted to enter and coact with said internally coned surface, an external flange on said ring adapted for abutment against the end face at the wider end of the coned surface of said sleeve, and a packing element revoluble on the pipe and adapted to be compressed between the flange of the ring and the junction piece when the coupling nut is screwed upon the junction piece to cause the coned surface of the sleeve to contract the ring upon the pipe until the end face of said ring abuts against the flange on the ring.

The internally coned sleeve may be loosely inserted in the coupling nut or it may be permanently attached to but revoluble in the coupling nut. By reason of the fact that the coupling nut is free to revolve upon the sleeve, which in turn is arranged to engage the ring to contract the latter radially inwards into fixed engagement with the pipe, the coupling nut can be screwed tightly upon the junction piece without being capable of rotating the sleeve, although the latter is forced tightly into engagement with the ring by the pressure of the internal shoulder of the coupling nut against the sleeve. Thus any possibility of the end of the pipe being twisted when screwing-up the coupling nut is eliminated.

The accompanying drawings illustrate examples of pipe coupling devices according to the present invention. The views show the coupling device half in elevation and half in section.

Figs. 5 and 6 are views corresponding to Figs. 1 and 2 showing a further modification in which the packing element is adapted to abut against the end face of the junction piece which is not conically counterbored as in Figs. 1–4.

Figure 1:
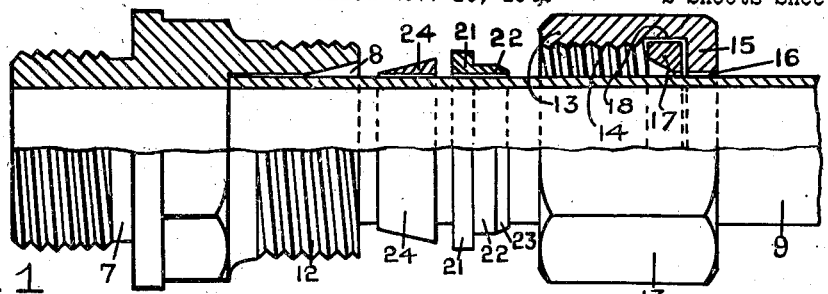
Figs. 1 and 2 show the parts of one form of coupling device, Fig. 1 showing the parts expanded and Fig. 2 showing the completed joint.

As shown in the drawings, the pipe coupling device includes a tubular junction piece 7 which is internally counterbored at 8 to receive the end of the pipe 9 which is to be coupled thereto. The junction piece may be of the form shown in Figs. 1–4, or any other suitable form of metal fitting, such as an elbow fitting 10 or a T-piece 11 as shown in broken lines in Fig. 5. The junction piece 7 is externally screw-threaded at 12 to receive a coupling nut 13 having an internal screw-thread 14 to fit the screw-thread 12. The back of the coupling nut has an inturned shoulder 15 which is cylindrically apertured at 16 to rotate on the pipe 9. Between the shoulder 15 and the screw-thread 14 of the nut is an internally coned solid metal sleeve 17. This sleeve is of slightly smaller diameter than the internal diameter of the screw-thread 14, so that the sleeve 17 can be fitted into the nut 13 through the screw-threaded end thereof. The sleeve 17 may be a loose sleeve detachable from the nut as shown in Figs. 5 and 6, but it is preferred to attach the sleeve 17 to the nut 13 in such a manner that the sleeve cannot fall out of the nut or be removed therefrom, while being free to turn in the nut. For this purpose the nut 13 may be provided between the screw-thread 14 and the shoulder 15 with an annular recess 18 (Figs. 1 and 2) having a diameter which is preferably equal to or greater than the maximum diameter of the screw-thread 14. After the sleeve 17 has been inserted in the nut 13, it is expanded in the recess 18 so as to be permanently attached to the nut while being free to revolve in the recess 18 between the screw-thread 14 and the shoulder 15. In the modification shown in Figs. 3 and 4 the sleeve 17 has an external diameter which is less than the internal diameter of the screw-thread 14, and has a reduced cylindrical extension 19 adapted to enter the hole in the back of the nut, the hole in this case being made large enough to receive the extension 19 and being externally counter-bored so that, after the extension 19 has been entered into the hole 16, the extension 19 can be expanded at 20 into the counter-bore so as to permanently attach the sleeve 17 to the nut 13 while permitting the sleeve extension 19 to revolve in the hole in the back of the nut. Alternatively, the sleeve extension 19 may protrude through the back of the nut and be turned outwards against the outer face of the shoulder 15.

It will be observed that the internally coned surface of the sleeve 17 tapers towards the shoulder 15 of the ring and presents an abrupt end face at the wider end of the coned surface.

Figure 3:
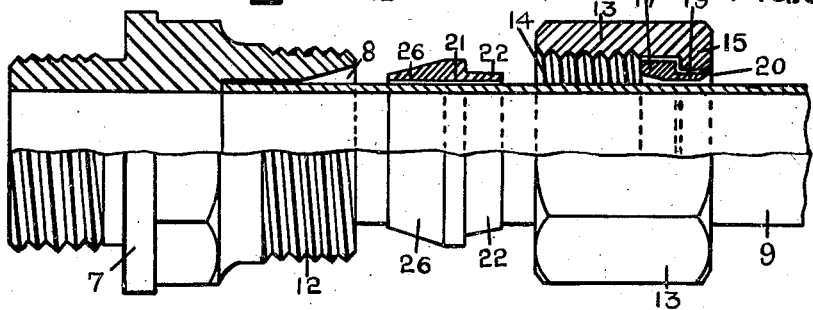
Figs. 3 and 4 are views corresponding to Figs. 1 and 2 showing a modification in which the ring is tapered throughout its length from the flange which is integral with the packing element.

Revolubly fitted upon the pipe 9 is a solid or unsplit ring 22 of deformable metal having an integral flange 21. The ring 22 is adapted to enter into and coact with the coned surface of the sleeve 17 and the flange 21 is adapted to coact with the abrupt end face of the sleeve 17. The ring 22 may be cylindrical with or without a chamfered end 23 as shown in Figs. 1 and 5 or tapered throughout its length as shown in Fig. 3.

Figure 2:
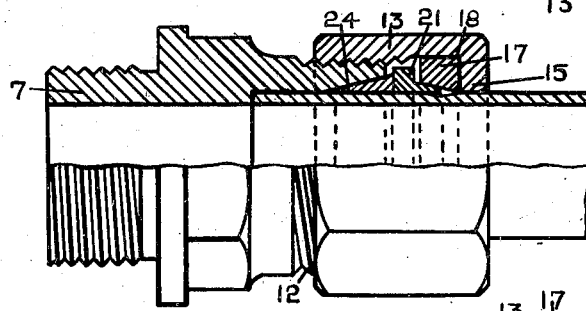
Figure 4:
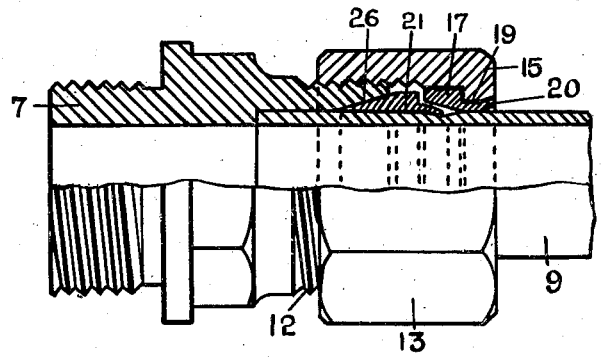

Also revolubly fitted on the pipe 9 behind the ring 22 and flange 21 is a packing element. This packing element may be a ring 24 as shown in Figs. 1 and 2 or it may be a ring or washer 25 as in Figs. 5 and 6. As shown in Figs. 1 and 2 the junction piece 7 is conically counterbored at 8 and the packing ring 24 is externally coned to enter the counterbore 8. The packing ring 24 may be a separate solid or unsplit ring of deformable metal, or it may be made of resilient material, such as a ring of leather, rubber, asbestos or the like. Obviously, if the counterbore 8 is cylindrical instead of conical as shown, the packing ring 24 will also be cylindrical to conform to and enter the counterbore in the junction piece. Figs. 3 and 4 show a modification in which the packing element is in the form of an integral extension 26 of the flange 21 and ring 22, in which case the parts 21, 22 and 26 are all of metal. If the junction piece 7 is counterbored to closely fit the pipe 9 as in Figs. 5 and 6, the ring 25 may take the form of a hard or soft ring or washer adapted to be compressed between the flange 21 of the ring 22 and the end face 27 of the junction piece 7.

When the coupling nut 13 is screwed upon the junction piece 7, the shoulder 15 of the nut forces the sleeve 17 over the ring 22, and the internally coned face of the sleeve 17 compresses the end of the ring 22 radially inwards into fixed engagement with the pipe 9, so soon as the ring 24 or 25 has been forced into the counterbore 8 in the junction piece 7, or when the ring 26 has been pressed against the end face 27 of the junction piece 7 by axial displacement of the nut 13, sleeve 17 and ring 22 along the pipe 9. As the sleeve 17 crushes the ring 22 inwards into the pipe 9, the sleeve 17 is forced axially over the ring 22. If the nut 13 is screwed up until the abrupt end face of the sleeve 17 bears against the flange 21 of the ring 22, any further inward crushing of the ring 22 will be prevented and will thus prevent the ring 22 from reducing the fluid flow area through the pipe 9.

It will be observed that in all cases the nut 13 is free to revolve on the sleeve 17, so that when the sleeve 17 has crushed the ring 22 into fixed engagement with the pipe 9, the nut 13 cannot twist the sleeve 17 or cause it to twist the ring 22 and pipe 9.

I claim:

1. A pipe coupling device comprising a tubular member having an end portion counterbored to receive the end of a pipe to be coupled thereto and having an external screw-thread formed on said end portion, a coupling nut internally screw-threaded to fit the external thread on the end portion of said member, an inturned shoulder on said nut apertured to revolubly fit on the pipe, an internally coned solid metal sleeve revolubly mounted in said nut between the thread of the nut and said shoulder, said sleeve presenting an abrupt end face at the wider end of its internally coned surface which tapers towards said shoulder, a solid or unsplit ring of deformable metal revoluble on the pipe and adapted to enter and coact with said internally coned surface, an external flange on said ring and integral therewith and adapted for abutment against said abrupt end face, and a packing element revoluble on the pipe and adapted to be compressed between said flange and the end portion of said member when the coupling nut is screwed upon said end portion to cause said coned surface to contact the ring upon the pipe.

2. A pipe coupling device comprising a tubular member having an end portion counterbored to receive the end of a pipe to be coupled thereto and having an external screw-thread formed on said end portion, a coupling nut internally screw-threaded to fit the external thread on the end portion of said member, an inturned shoulder on said nut apertured to revolubly fit on the pipe, an internally coned solid metal sleeve having an external diameter which is less than the internal diameter of the screw-thread in said nut, said sleeve being loosely inserted in and revolubly mounted in said nut between the thread of the nut and said shoulder, said sleeve presenting an abrupt end face at the wider end of its internally coned surface which tapers towards said shoulder, a solid or unsplit ring of deformable metal revoluble on the pipe and adapted to enter and coact with said internally coned surface, an external flange on said ring and integral therewith and adapted for abutment against said abrupt end face, and a packing element revoluble on the pipe and adapted to be compressed between said flange and the end portion of said member when the coupling nut is screwed upon said end portion to cause said coned surface to contract the ring upon the pipe.

3. A pipe coupling device comprising a tubular member having an end portion counterbored to receive the end of a pipe to be coupled thereto and having an external screw-thread formed on said end portion, a coupling nut internally screw-threaded to fit the external thread on the end portion of said member, an inturned shoulder on said nut apertured to revolubly fit on the pipe, an internally coned solid metal sleeve having an external diameter which is less than the internal diameter of the screw-thread in said nut and having a reduced cylindrical extension adapted to enter the apertured shoulder of the nut between the aperture in said shoulder and said pipe, means for revolubly attaching said extension to said shoulder whereby said sleeve is revolubly mounted in said nut between the thread of the nut and said shoulder, said sleeve presenting an abrupt end face at the wider end of its internally coned surface which tapers towards said shoulder, a solid or unsplit ring of deformable metal revoluble on the pipe and adapted to enter and coact with said internally coned surface, an external flange on said ring and integral therewith and adapted for abutment against said abrupt end face, and a packing element revoluble on the pipe and adapted to be compressed between said flange and the end portion of said member when the coupling nut is screwed upon said end portion to cause said coned surface to contract the ring upon the pipe.

4. A pipe coupling device comprising a tubular member having an end portion counterbored to receive the end of a pipe to be coupled thereto and having an external screw-thread formed on said end portion, a coupling nut internally screw-threaded to fit the external thread on the end portion of said member, an inturned shoulder on said nut apertured to revolubly fit on the pipe, an annular recess in said nut between said shoulder and the screw-thread in said nut, said recess being of greater diameter than the internal diameter of the thread in the nut, an internally coned sleeve having an initial external diameter which is less than the internal diameter of the thread in said nut, said sleeve being expanded into said recess to a diameter such as to cause said sleeve to be revolubly mounted in said nut between the thread of the nut and said shoulder, said sleeve presenting an abrupt end face at the wider end of its internally coned surface which tapers towards said shoulder, a solid or unsplit ring of deformable metal revoluble on the pipe and adapted to enter and coact with said internally coned surface, an external flange on said ring and integral therewith and adapted for abutment against said abrupt end face, and a packing element revoluble on the pipe and adapted to be compressed between said flange and the end portion of said member when the coupling nut is screwed upon said end portion to cause said coned surface to contract the ring upon the pipe.

5. A pipe coupling device comprising a tubular member having an end portion cylindrically bored to receive and closely fit the end of a pipe to be coupled thereto, said end portion being counterbored at its outer end to provide an annular recess around a portion of the pipe, an external screw-thread formed on said end portion, a coupling nut internally screw-threaded to fit the external thread on the end portion of said member, an inturned shoulder on said nut apertured to revolubly fit on the pipe, an internally coned solid metal sleeve revolubly mounted in said nut between the thread of the nut and said shoulder, said sleeve presenting an abrupt end face at the wider end of its internally coned surface which tapers towards said shoulder, a solid or unsplit ring of deformable metal revoluble on the pipe and adapted to enter and coact with said internally coned surface, an external flange on said ring and integral therewith and adapted for abutment against said abrupt end face, and a packing element revoluble on the pipe and shaped to conform to the shape of the annular recess around the portion of the pipe received in said tubular member, said packing element being forced into said annular recess when the coupling nut is screwed upon said tubular member to cause said coned surface to contract the ring upon the pipe.

6. A pipe coupling device according to claim 1 wherein the flanged ring tapers throughout its length from the flange.

JAMES HUNTER LAMONT.